Sept. 15, 1925.
R. B. CALCUTT
MACHINE AND METHOD OF MAKING TIRES
Filed Feb. 23, 1924
1,553,362
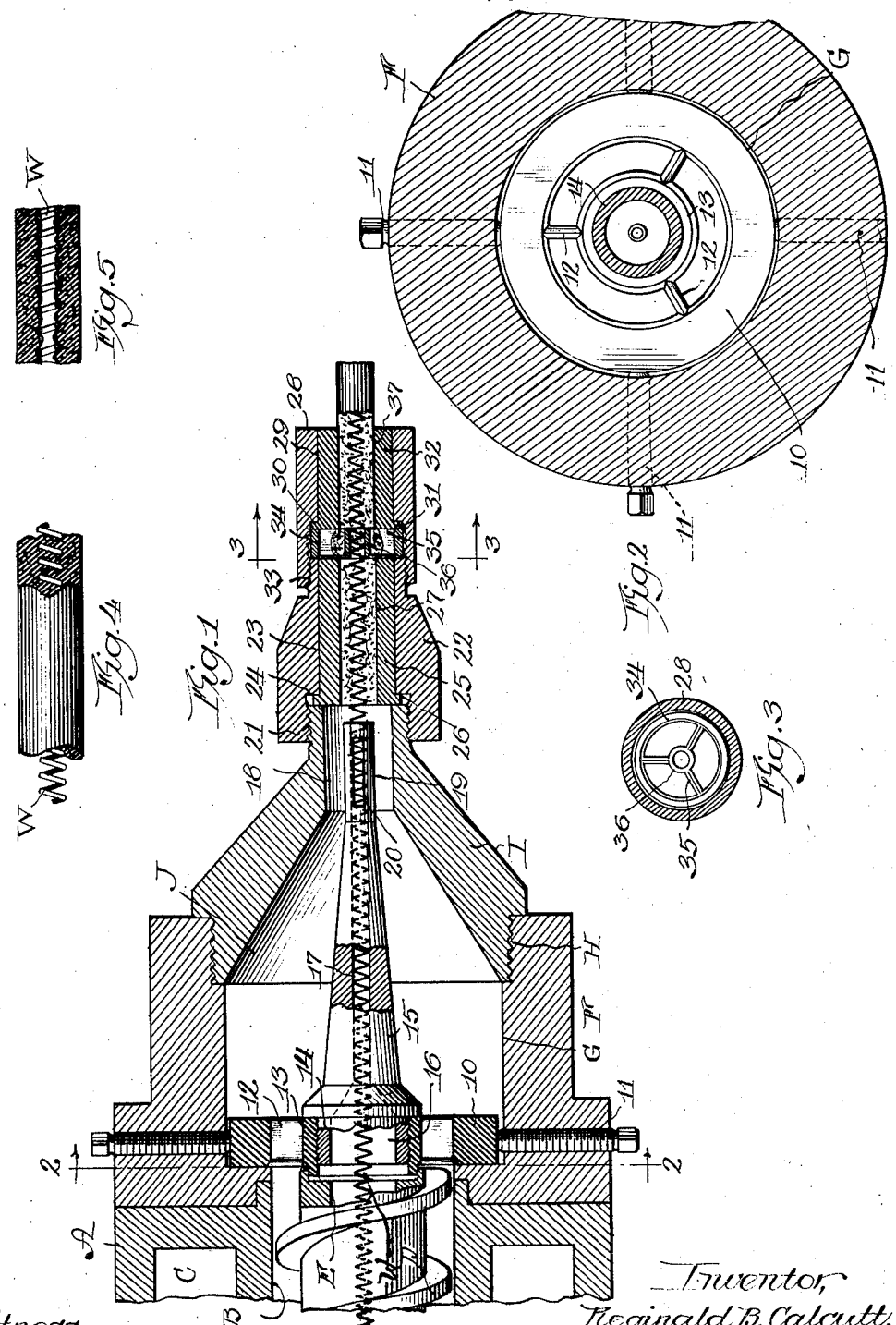

Patented Sept. 15, 1925.

1,553,362

UNITED STATES PATENT OFFICE.

REGINALD B. CALCUTT, OF CHICAGO, ILLINOIS.

MACHINE AND METHOD OF MAKING TIRES.

Application filed February 23, 1924. Serial No. 694,644.

*To all whom it may concern:*

Be it known that I, REGINALD B. CALCUTT, a citizen of the United States, and a resident of Chicago, in the county of Cook and State of Illinois, have invented certain new and useful Improvements in a Machine and Method of Making Tires, of which the following is a full, clear, and exact description, such as will enable others skilled in the art to make and use the same.

My present invention relates to an apparatus for forming solid cushion tires from rubber and inserting therein, during the process of manufacture, a spirally coiled wire. My invention also relates to the method of manufacture thereof which is carried out in the apparatus herein disclosed.

In the manufacture of cushion tires for baby carriages, go-carts, and similar small vehicles, it is desirable to provide a solid rubber tire of cylindrical section and to have imbedded therein a core formed from a spirally coiled wire. This permits of longitudinal elasticity and yieldability, and also affords means whereby the ends of the tire may be conveniently secured together before placing it upon the rim or felly of the wheel. In tires of this character, it is desirable, though not essential, to completely imbed the spirally coiled wire in the rubber body of the tire so that the rubber will be entirely through the tire, both inside and outside the core. It is, therefore, the principal object of my invention to provide an apparatus and method whereby a spirally coiled wire, which forms the core in the completed tire, may be fed into and through a tire making machine and so positioned that it will be positively maintained concentric with the axis of the cylindric rubber body member forming the body of the tire. It is also an object of my invention to provide means whereby the rubber, in a plastic condition, will be inserted between the convolutions and within the bore of the spiral wire coil so that it will either entirely fill the central portion thereof or will coat the spiral wire coil both inside and outside. A further object of my invention resides in providing an apparatus in which the before-mentioned functions, objects and advantages are accomplished in a quick and dependable manner so that the machine may be rapidly operated and thereby increase the daily footage production turned out by the operator. The foregoing, and other objects, I prefer to accomplish in substantially the manner hereinafter fully described and as more particularly pointed out in the appended claims. Reference will now be made to the accompanying drawings that form a part of this specification in which—

Figure 1 is an axial longitudinal section of my improved device for forming a tire.

Figure 2 is a transverse section on line 2—2 of Figure 1.

Figure 3 is a transverse section on line 3—3 of Figure 1.

Figure 4 is a fragmentary view, partly in longitudinal section, of a tire made in accordance with my present invention.

Figure 5 is a similar view of another tire structure.

In the drawings, similar reference characters have been employed to designate the same parts through the several views.

Referring more particularly to Figure 1, A designates a barrel or housing of a standard feeding apparatus that has a cylinder with a central bore B, and which, intermediate the bore and the outer wall, is provided with an annular chamber C to which steam or other heating fluid is admitted for the purpose of rendering the rubber plastic and mouldable. Mounted within the central bore B is a rotating worm or screw D, which, in operation, feeds the plastic material forwardly toward the discharge end of the machine, which screw is centrally bored as at E throughout its entire length to permit the spirally coiled wire W to be fed centrally or axially therethrough. Mounted at the discharge end of the housing A is a head F that is suitably secured thereto and is provided with a central bore G of preferably greater diameter than the bore B of the housing A and has its outer portion internally threaded, as at H, to receive the conically bored nozzle I. The bores of the nozzle I and the head F provide a chamber J into which the plastic rubber is forced by the worm or screw D when the latter is revolved, and in entering said chamber the rubber passes through a suitable spider mounted adjacent the outer end of the bore B of the housing. The spider just referred to consists of a ring 10 of preferably less outside diameter than the bore G of the head and is capable of adjustment in any transverse direction by means of the set screws or bolts 11 that are screwed radially into the adjacent portion of the head G and have their inner ends engaged with the exterior or periphery of the ring 10. Radial webs 12 connect the ring 10 with a central hub 13 that is internally threaded to receive the threaded and shouldered end portion 14 of a hollow elongated tapered pin 15 so as to provide a passageway 16 at the shouldered portion, and throughout the tapered portion the bore 17 of the pin is of a uniform diameter, which is very slightly larger than the exterior diameter of the spiral coil of wire so that the latter will readily pass therethrough.

At the outer portion of the nozzle its conical bore is merged to a cylindrical bore 18, and the adjacent portion 19 of the pin 15 is also formed cylindrically and is provided with one or more lateral apertures or longitudinally elongated radial slots 20 upon opposite sides. The cylindrical portion of the pin is spaced from the walls of the bore 18 of the nozzle a suitable distance so that the plastic rubber, as it is forced into this restricted bore 18 of the nozzle, will enter the slots 20 in a transverse direction and fill the interior of the spiral wire coil prior to, or just at, the time when the tire is exteriorly shaped. This insures the imbedding of the spiral coil of wire in the body as it passes through the machine, so that thereafter it is only necessary to coat the wire upon its exterior to the desired thickness and contour of the finished tire.

The dicharge end of nozzle 18 is exteriorly threaded as at 21, and the rear section 22 of the forming die is screwed upon these threads. This forming die 22 is cylindrical in transverse section and is provided with a smooth bore 23, and at its rear end the bore is increased in diameter to provide a shoulder 24 and is threaded to engage the threads 21 on the adjacent end of the nozzle. Inserted in the bore 23 of the die section 22 is a cylindrical bushing 25 having an annular shoulder 26 upon its rear end to abut the shoulder 24 in the bore of the die section 22, and when the latter is screwed onto the nozzle the end of said nozzle will force the shoulder of the bushing 25 against the shoulder 24 of the die section. The bushing 25 has its bore 27 of substantially the diameter of the finished tire, and the spiral wire coil forming the core of the tire and filled with the rubber which it has received through the slots 20 of the pin, passes through this bore 27 with the plastic rubber which has been fed from the chamber J through the bore 18 and around the end 19 of the pin. The outer die section 28 is of cylindrical shape, and its bore 29 is increased in diameter to provide a shoulder 30 about midway its length to be engaged with the annular shoulder 31 on the adjacent end of a bushing 32 that is inserted into the bore 29 of this die section. The enlarged rear portion of the bore 29 is shouldered and is screwed upon the threaded cylindrical end 33 of the rear die section 22. Interposed between the shouldered end 31 of the forward bushing 32 and the adjacent end of the rear die section 22 is a small spider 34 that is similar to, but smaller than, the spider at the discharge end of the housing. The radial webs 35 of this spider have their rear edges beveled to a sharp edge, and the central hub also has its annular rear edge 36 beveled so that when the rubber reaches the same it will be divided radially into segments, and the beveled sharp edge 36 of the hub will cut away the rubber around the spiral wire coil, as seen in Figure 1 of the drawings, so that the spirally coiled wire and its rubber core only will pass through the hub of this spider. These segments of the plastic rubber and the core of the spirally coiled wire are forced together after passing through the spider in the bore 37 of the bushing 32 of the outer die section 28, which bore is of slightly less diameter than the bore 27 of its companion bushing. The rubber, being in a plastic condition, and under the high pressure from a worm or screw D, will readily unite all of the segments and the core of the spiral coil so that the structure is discharged at the outer end of the die section 28 in a complete tire of the desired cross sectional dimension and conformation and with the spiral coil accurately centered therein. The spider 34 acts as the final means for centering the spirally coiled wire core, and, due to the fact that the dies, the spiders, and the pin are all in axial alinement with each other, the apparatus may be operated rapidly and without liability of offsetting the spirally coiled wire core.

The final product, when discharged from the machine, will have the spirally coiled wire imbedded in the rubber body, either with the solid core as illustrated in Figure 4 or there may be a hollow bore in the center of the spiral wire coil, as illustrated in Figure 5, the same depending upon the amount of pressure under which the plastic material is fed or the size of the lateral aperture in the pin, it being understood that I am not limited to the particular type of cushion tire made by this apparatus and method. It will also be appreciated that I am not limited to the precise structure illustrated herein for carrying out my invention as modifications may be made without departing from the principles herein disclosed.

What I claim is:—

1. An apparatus for forming cushion tires comprising means for feeding plastic material under pressure, a discharge nozzle therefor having a central chamber, means mounted upon the outer end of said nozzle for forming the exterior contour of the tire, and a hollow pin within the central chamber of said nozzle through which a spirally coiled wire is moved, said pin terminating back of said means and provided with lateral openings through which the plastic material passes into the core of the spiral wire coil prior to the latter receiving its exterior coating.

2. An apparatus for forming cushion tires comprising means for feeding plastic material under pressure, a discharge nozzle therefor having a central chamber, forming dies mounted upon the discharge end of said nozzle, a device interposed between said dies for longitudinally dividing the plastic material fed through said dies, and means within said nozzle for directing a spiral wire coil to said dies and centering the same with respect thereto.

3. An apparatus for formng cushion tires, comprising means for feeding plastic material under pressure, a discharge nozzle therefor having a central chamber, means mounted upon the outer end of said nozzle for forming the exterior contour of the tire, a hollow pin within the central chamber of said nozzle through which a spirally coiled wire is moved, said pin terminating back of said means and provided with lateral openings through which the plastic material passes into the core of the spiral wire coil prior to the latter receiving its exterior coating, and devices for adjusting and maintaining the position of said pin with respect to said nozzle and forming means.

4. An apparatus for forming cushion tires comprising means for feeding plastic material under pressure, a discharge nozzle therefor having a central chamber, forming dies mounted upon the discharge end of said nozzle, a device interposed between said dies for longitudinally dividing the plastic material fed through said dies, means within said nozzle for directing a spiral wire coil to said dies and centering the same with respect thereto, and devices for adjusting and maintaining the position of said means with respect to said nozzle and dies.

5. An apparatus for forming cushion tires comprising means for feeding plastic material under pressure, a discharge nozzle therefor having a central chamber, and means within said chamber for positioning and directing a spirally coiled wire to the mouth of said nozzle, said means provided with a lateral orifice through which the plastic material is passed into the bore of the spirally coiled wire.

6. The method of manufacturing cushion tires having a spiral wire coil imbedded therein consisting in inserting the rubber or the like laterally into the convolutions of the spiral wire core, whereby an inside coating of the latter is secured and forming a relatively heavy coating of rubber or the like upon the outside of the spiral wire core.

7. In the method of manufacturing cushion tires having a spiral wire core imbedded therein, the insertion of the rubber laterally into the convolutions of the spiral core while the material is in transit and prior to reaching the dies, whereby to fill the interior of said core.

8. In the method of manufacturing cushion tires having a spiral wire coil imbedded therein, the feeding of the wire through a hollow cylinder of the plastic material and the insertion of the plastic material laterally between the convolutions of the coil, whereby the central portion thereof is coated prior to the application of the exterior coating.

Signed at Chicago, county of Cook and State of Illinois, this 21st day of February 1923.

REGINALD B. CALCUTT.